Dec. 15, 1959  E. G. PERRY, JR., ET AL  2,917,707
ELECTRICAL RECORDER MOVEMENTS
Filed Sept. 19, 1956  4 Sheets-Sheet 1

INVENTORS
Edward Gordon Perry, Jr.
and Robert W. Olson
BY Stevens, Davis, Miller and Mosher
ATTORNEYS

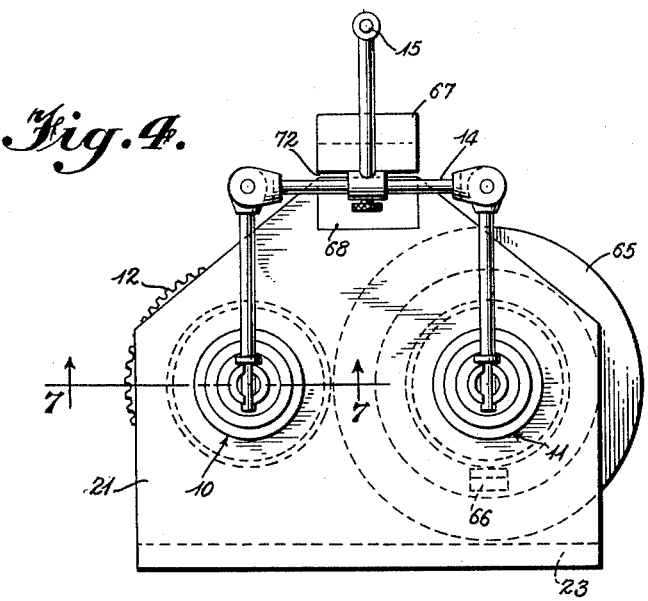
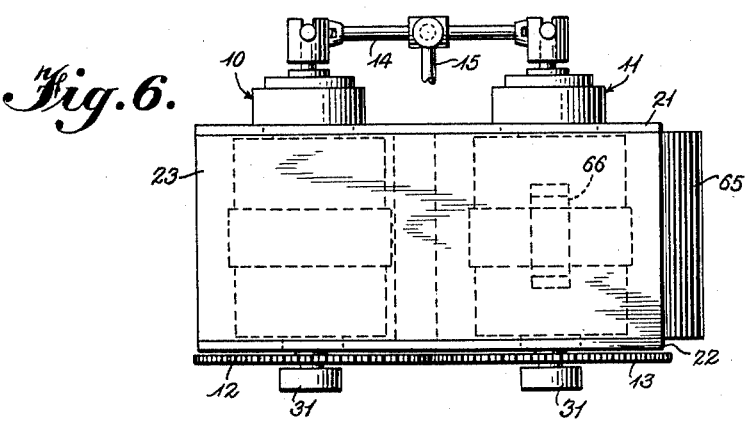
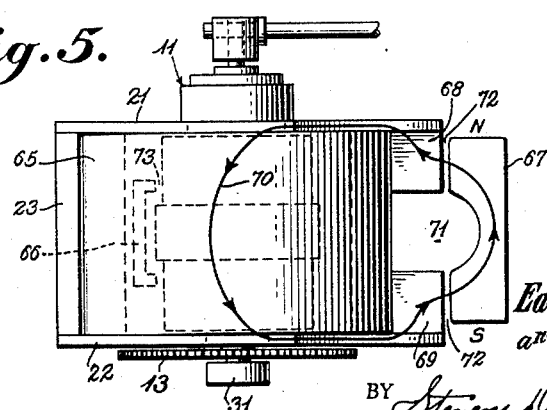

Dec. 15, 1959 E. G. PERRY, JR., ET AL 2,917,707
ELECTRICAL RECORDER MOVEMENTS
Filed Sept. 19, 1956 4 Sheets-Sheet 3
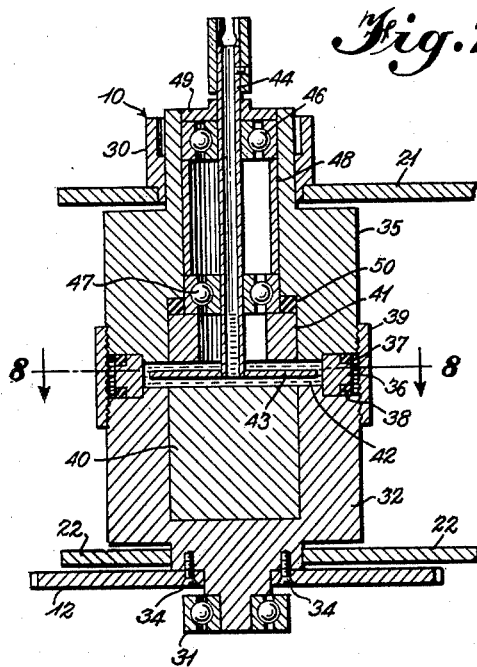
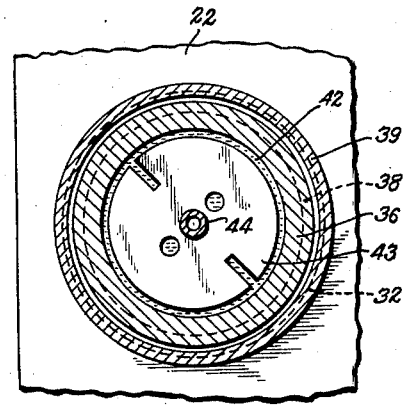
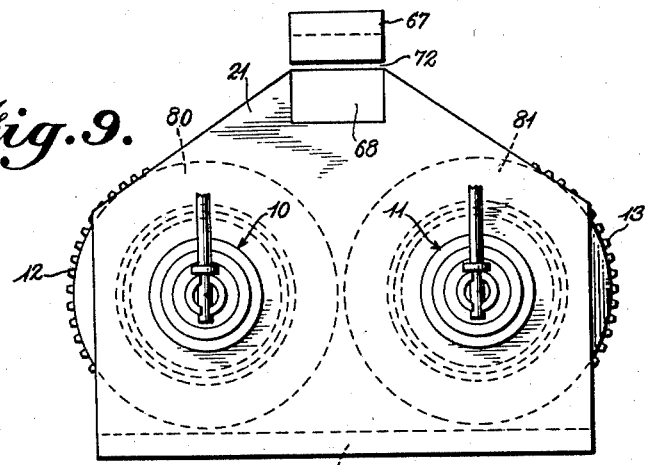
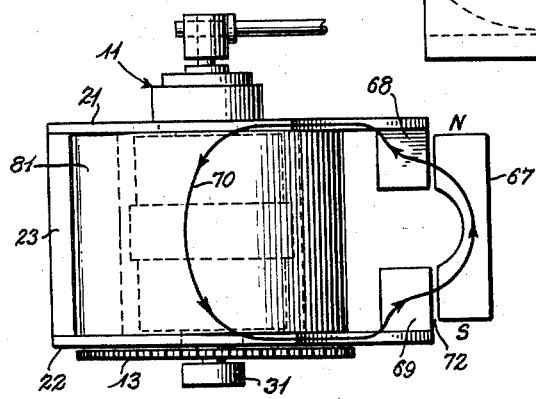
INVENTORS
*Edward Gordon Perry, Jr.*
*and Robert W. Olson*
BY *Stevens, Davis, Miller and Mosher*
ATTORNEYS Dec. 15, 1959  E. G. PERRY, JR., ET AL  2,917,707
ELECTRICAL RECORDER MOVEMENTS
Filed Sept. 19, 1956  4 Sheets-Sheet 4

INVENTORS
Edward Gordon Perry, Jr.
and Robert W. Olson

BY Stevens, Davis, Miller & Mosher
ATTORNEYS

United States Patent Office 2,917,707
Patented Dec. 15, 1959

2,917,707

ELECTRICAL RECORDER MOVEMENTS

Edward Gordon Perry, Jr., Dallas, and Robert W. Olson, Houston, Tex., assignors to Texas Instruments Incorporated, Dallas, Tex., a corporation of Delaware Application September 19, 1956, Serial No. 610,786

5 Claims. (Cl. 324—76)

This invention relates primarily to electrical recorder movements, but it is not limited thereto since its principles and the apparatus to be described are usable generally in electrical meters, electrical controls and other analogous devices.

Specifically, this invention relates to an electrical recorder movement, utilizing a pair of opposed magnetic particle clutches in push-pull relationship. Such a recorder movement has been shown and described in application Serial No. 248,732 filed September 28, 1951, of which this application is a continuation-in-part. This application is directed to certain improvements in the apparatus described therein.

The main improvements involved in this application may be briefly stated as (1) the use of a single coil for supplying signal flux to the magnetic clutches in parallel resulting in the necessity of utilizing but a single permanent magnet for supplying bias flux in series to the clutches; (2) the use of a single coil for supplying signal flux to the magnetic clutches in series and a single permanent magnet supplying the required clutch bias flux; (3) the use of a separate coil for each clutch connected either in series or in parallel.

The present invention, as did the invention of the application of which this application is a continuation, has to do with a system in which the clutches act in push-pull relation, as distinguished from a system in which two clutches are connected to a push-pull electrical system and merely act in opposition. In the present system, the push-pull effect is produced by the clutches themselves rather than by a supplemental electrical circuit.

There are several ways in which this can be done, all of them within the scope of this invention. Fundamentally, the only requirements are that each clutch be magnetically biased, and that magnetic flux be applied to each clutch to represent the current to be measured, and, lastly but most importantly that the relation between the biasing flux and the measurement flux be different in the two clutches. In other words, they should be aiding in one clutch, and opposing in the other for any given direction of current to be measured.

Under the above circumstances, by properly setting the strength of the biasing flux, each of the clutches can be caused to operate on the most linear part of its curve and any lack of linearity that exists may be largely balanced out by the fact that it is of opposite direction in the opposed clutches.

Up to the time of the present invention, it was the practice to mount the magnet coil of the magnetic clutch in one of the two rotating elements. Since one of these elements was driven at constant speed by an outside source of power, and the other element was adapted to change torque depending upon the coupling, it was the usual practice to mount the electro-magnet coil in the constantly driven element so that the element that was to change speed would have as little inertia as possible. This was particularly desirable in an electrical recorder or meter movement.

In the application, of which this application is a continuation in part, the electro-magnet coil is mounted without the clutch assemblies and is driven by an external source of power, and as can be seen from this application, this construction necessitates the use of two permanent magnets to maintain a biasing flux. Obviously costs could be cut if only one magnet were used with no sacrifice in function.

The possibility of placing the electrical coil in the other clutch element has been considered, since the other clutch element does not rotate completely, and the driving current could be connected to it through hair springs as it is in many ordinary meters and recorders, but such a construction has been found unsatisfactory because the operating coil adds considerable weight and inertia to the moving parts of the recorder movement, and thus slows up the response to changes in current.

According to this invention, it has been discovered that the clutches and their attendant parts can be formed as a magnetic circuit with the operating coil in a stationary part of the construction, and the magnetic circuit extending into and through both externally driven parts and the ultimately driven clutch part without any electrical connections to either of them. This is a major improvement in magnetic clutch construction, particularly those used in a recorder or meter movement, because the rotation of the clutch parts causes no significant change in the magnetic flux passing through the clutch, whereas it does make significant changes in the electrical current flowing through a set of slip-rings.

A further improvement affected by this invention is the utilization of one or more magnetic operating coils to actuate two magnetic circuits both of which extend through the operating coil or coils, and one of which extends to each of the magnetic particle clutches. Additionally only one permanent magnet need be employed to provide the proper biasing flux.

As in the application, of which this application is a continuation, each of the two magnetic particle clutches is magnetically biased to cause it to operate on the desired part of its operating curve, but in the construction of this application, it has been found possible to place the biasing magnet, as well as the operating coil or coils, outside of the clutches themselves. Instead, in one embodiment, the signal coil is placed so that it surrounds one clutch. The signal coil provides a magnetic flux to both clutches in series. In another embodiment, the signal coil provides flux in parallel. When two signal coils are employed, both clutches may then be surrounded by signal coils. They may be connected in series or parallel.

Still further advantages have been obtained in the present construction by the use of magnetic particles not suspended in any liquid, for it has been found, that this practice reduces the residual drag in the clutches and increases their sensitivity.

Further, it is an object of this invention to provide an instrument of the above mentioned nature which is easy to construct, simple in operation, very rugged, rapid in its response to changes in current, and very accurate.

Further details and advantages of this invention will be apparent in the following details of description of embodiments of the clutch as illustrated in the appended drawings. However, the exemplary embodiments are illustrative of the invention but are not to be construed as placing limitations on the scope other than as are set forth in the appended claims.

With reference to the drawings:

Figure 4 is a top plan view of one of the embodiments of this invention;

Figure 5 is an elevation of the embodiment shown in Figure 4;

Figure 6 is a side elevation of the embodiment shown in Figure 4;

Figure 7 is a view taken along the lines 7—7 of Figure 4;

Figure 8 is a view taken along the lines 8—8 of Figure 7;

Figure 9 is a top plan view of another embodiment of this invention;

Figure 10 is a side elevation of the embodiment shown in Figure 9.

Figure 1:
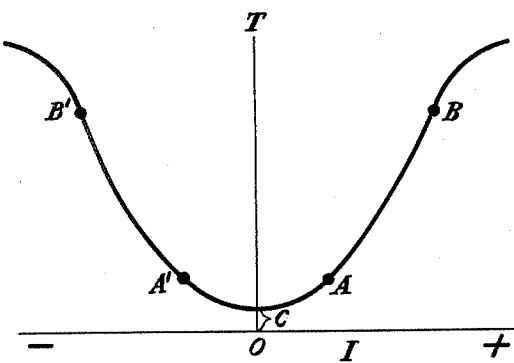
Figure 1 is a curve showing the relation between torque and current in a single magnetic particle clutch.

With reference first to Figure 1 of the drawings, it can be seen that when the current increases in a positive direction, the slope of the torque-current curve increases from zero until it reaches a maximum value of point A. Thereafter, it remains approximately a constant to point B. If the current is reversed, the slope of the current increases to point A' and then remains approximately constant to point B', after which further increases of current produce little and finally no increase in torque.

Figure 2:
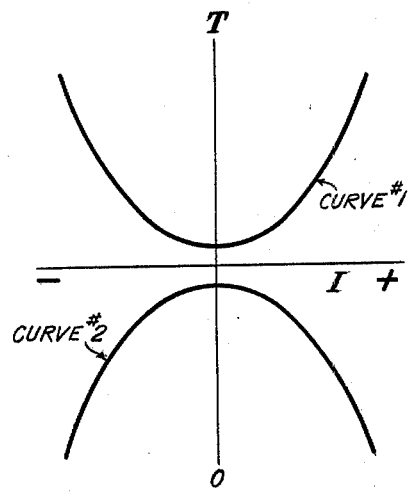
Figure 2 is a curve showing the relation between torque and current in two opposed magnetic particle clutches without any magnetic bias.

Referring to Figure 2 of the drawings, curve No. 1 represents the torque-to-current curve of one clutch and curve No. 2 represents the torque-to-current curve of a second clutch connected in opposition thereto. As these clutches are connected in opposition and both receive the same operating current, the resultant torque is zero for every value of current since the resultant torque is the sum of the torques of the two clutches and they are always equal for equal currents.

Figure 3:
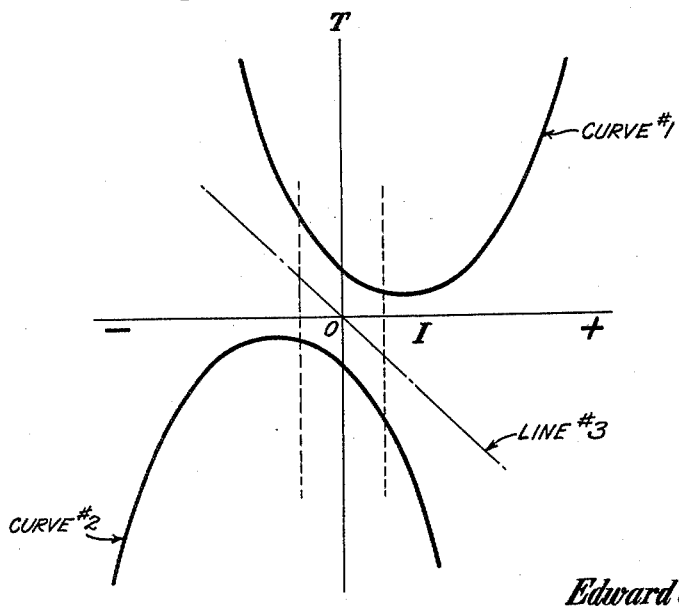
Figure 3 is similar to Figure 2 except that a magnetic bias has been provided for each of the clutches.

Referring to Figure 3, curve No. 1 represents the torque-current curve of one clutch with magnetic bias and curve No. 2 represents the torque-current curve of a second clutch connected in opposition thereto, also with magnetic bias. Either the bias or the operating coil acts in opposite directions on the two clutches. It can be seen from this figure that the torque developed by each clutch on zero current is somewhat more than the mere frictional or viscose drag of the clutch. This increase in torque is attributable to the magnetic bias.

The curves are still symmetrical but the minimum torque point on each is shifted, one in the positive direction, and the other in the negative direction, due to the fact that they are opposed and that the magnetic bias or operating coil is arranged oppositely with respect to the clutches. It can be seen from this that the resultant torque of the two falls along the center portion of line 3 in this figure. The torque-to-current characteristic, then, of the two opposing clutches with their magnetic bias is approximately a straight line, giving linearity of response over an extended range. For any increase in current in either direction there is a relatively constant increase of torque in the corresponding direction.

As indicated, this result may be achieved by any combination of operating flux and bias flux in which the two are opposed in one clutch when they are aiding in the other.

In one embodiment illustrated in Figures 4 to 8, inclusive the operating coil supplies magnetic flux to both clutches in series and the magnetic bias acts oppositely in one clutch and aids the flux produced in the other.

It is possible to use one operating coil for this simplifies the construction and helps to keep the effect on the clutches balanced. However, a separate coil for each clutch can be used and they can be connected either in series or in parallel. Figures 9 and 10, inclusive, show the utilization of two separate coils.

It is preferred to rotate the clutches in opposite directions, but they can be rotated in the same direction and simply connected by the necessary levers or gears to make them oppose each other.

One of the embodiments of the electrical recorder movement of this invention is illustrated in Figures 4 through 8, inclusive. As illustrated it comprises basically, two magnetic particle clutch assemblies 10 and 11, driven in opposite directions through meshing gears 12 and 13, by a source of power not shown, in opposition through a linkage 14 to operate a recorder pen or the like 15. The magnetic particle clutch assemblies 10 and 11 are biased respectively by a permanent magnet 67 and are furnished with operating flux corresponding to the current to be measured by an operating coil 65.

The frame of the recorder consists of a top plate 21, a bottom plate 22 and a vertical plate 23. These four parts are appropriately connected together by machine screws to form the frame of the meter movement. This is actually a sub-frame in the entire recorder assembly.

In the one embodiment, the operating coil 65 surrounds the magnetic particle clutch assembly 11. In another embodiment of this invention, operating coils 80 and 81 are situated so as to surround the two magnetic particle clutch assemblies 10 and 11.

The top and bottom plates 21 and 22 are of highly permeable material so as to readily conduct the electromagnetic lines of force. The vertical connecting plate 23, however, is of magnetically transparent or non-permeable material so that it will not act as a shunt across the clutches.

The operating coil of the clutch is mounted upon the clutch assembly and is arranged to have any suitable number of turns so as to produce the desired amount of flux without presenting undue resistance to the circuit into which it is connected. The upper frame plate 21 and the lower frame plate 22 are symmetrically shaped so as to conduct equal amounts of bias flux to the two magnetic clutches.

The detailed construction of the magnetic clutches is shown in Figures 7 and 8. It will be noted that although the main body of the magnetic clutch is arranged to rotate within the openings in the recorder movement frame, bearings are provided for the main body of the clutch, which bearings are adapted to be received in appropriate members on the main frame of the recorder to support both the clutches and a recorder movement sub-frame. Thus, as can be seen in Figure 7 an upper solid bearing 30 and a lower ball bearing are provided. By supporting these in appropriate members on the main frame of the recorder (not shown), the whole recorder movement assembly is supported.

At the top, the top recorder sub-frame plate 21 surrounds the lower end of a bearing 30 and at the bottom, the bearing 31 supports the lower half 32 of the body of the magnetic particle clutch and the lower recorder sub-frame plate 22 surrounds this lower body member at a point just above the place where the driving gear 12 is affixed to it by screws 34. This permits the clutch to be driven through the gear 12 from below the lower recorder movement frame plate 22.

The body of the magnetic particle clutch is completed by an upper body portion 35 that extends through and is journalled in the bearing 30. The two sections of the body are spaced apart by a spacer ring 36 of non-magnetic material and this spacer ring is provided with grooves to receive a pair of gaskets 37 and 38 which prevents the escape of material from the inside clutch body. The lower body portion 32 and the upper body portion 35 are held tightly against the spacer ring 36 and the sealing rings 37 and 38 by a non-magnetic retaining ring 39 which is threadedly connected to the lower end of the upper body member 35 and to the upper end of the lower body member 32.

Within the body members a small clutch cavity is formed and a magnetic path defined by filling the lower body member with a non-permeable material 40 and by placing a non-permeable lining ring 41 in the upper clutch body 35. As a result, the clutch chamber 42 is defined and magnetic flux is caused to flow through the body members 32 and 35 and the area near the periphery of the chamber 42 thus causing the changes in flux to have a maximum effect upon the operation of the clutch.

In the clutch chamber 42, there is positioned a small light weight clutch disc 43 mounted upon the lower end of a hollow shaft 44. This shaft extends out of the top end of the clutch where it is connected by suitable connections to the linkage 14 through which it is connected in opposition to the other clutch and through which it also drives the recorder pen or other mechanism generally indicated as 15.

The clutch plate 43 and supporting shaft 44 are supported in the clutch by being mounted in two sets of ball bearings 46 and 47. The outer races of these ball bearings are mounted in the upper clutch body 35 and are spaced apart by a spacer ring 48 and covered at the top by an annular cover plate 49. A gasket 50 placed just outside of the bottom set of ball bearings prevents clutch liquid or particles from passing between the bearing race and the upper body 35. Since the clutch plate supporting shaft 44 is hollow the magnetic particles or the magnetic particles suspended in liquid may be inserted therethrough to fill the clutch.

The biasing of the clutches is accomplished from outside of the clutches by a U-shaped permanent magnet 67 which is held against the end of plates 21 and 22. However, there is a gap 72 between said magnet and the magnetically permeable blocks 68 and 69 attached to plates 21 and 22. The gap may be adjusted so as to change the bias flux across the clutches. The magnet is so oriented with respect to the clutches so as to bias them in the opposite directions. The lines of force 70 proceed from the permanent magnet through blocks 68 and 69, into the plates 21 and 22 and thence into the clutch assemblies. The reluctance of air gap 71 is so high that very little flux crosses the gap.

Single coil 65 applies a flux in series to both clutches. Since the coil 65 surrounds clutch 11, clutch 10 would receive less flux. Therefore, a magnetic flux shunt 66 is used as a flux equalizer between the two clutches. Shunt 66 is located inside of coil 65 and outside clutch 11 and is made adjustable. As flux is generated by the coil in either direction, a certain portion will cross air gap 73 to shunt 66 and by-pass the working gap of clutch 11. The by-passed flux will continue through the shunt, across the other air gap 73 and then to magnetic clutch 10. By adjusting air gap 73, the amount of flux by-passed can be varied until the flux through clutch 10 is equal to the flux through clutch 11.

Signal coils 80 and 81, in another embodiment of the invention, illustrated by Figures 9 and 10, surround clutches 10 and 11 respectively. These coils are of equal size and number of turns. Each coil is centered equidistant from its clutch on all sides; therefore, a balanced signal flux is applied to the clutches. These coils can be connected either in series or in parallel.

Figure 11:
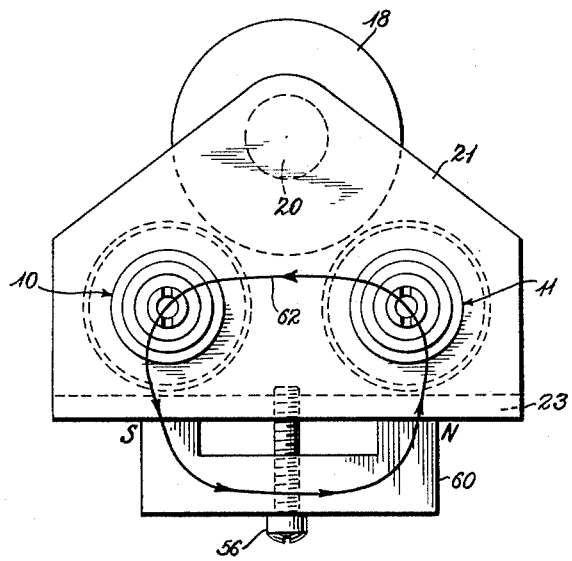
Figure 11 is a top plan view of yet another embodiment of this invention.
Figure 12:
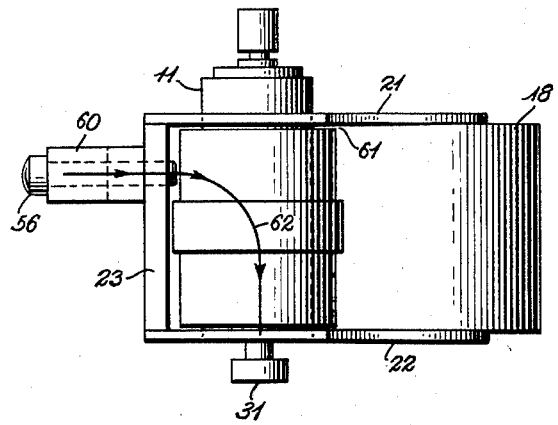
Figure 12 is a side elevation of the embodiment shown in Figure 11.

In another embodiment illustrated in Figures 11 and 12, inclusive, the operating coil acts in the same direction on both clutches and the magnetic bias acts oppositely.

In this embodiment operating coil 18 does not surround the clutch assemblies. Instead, the coil is mounted on core 20 which is connected to top plate 21 and bottom plate 22.

Core 20 is of highly magnetically permeable material, as are top and bottom plates 21 and 22, so as to readily conduct the electromagnetic lines of force from the operating coil 18 to the top and bottom of the two magnetic particle clutch assemblies 10 and 11. The coil 18 is situated equidistant from the clutch assemblies. Plates 21 and 22 are symmetrically shaped so as to conduct equal amounts of flux to the two magnetic clutches.

A single permanent magnet 60 is used for applying flux in series to both clutches. Permanent magnet 60 is mounted on plate 23 by bolt 56 and is located above the clutch working gap. It is immaterial whether the permanent magnet is located above or below the clutch working gap. In conjunction with magnet 60, an air gap 61 is provided which has a higher reluctance than the clutch working gap so that flux from the magnet will follow a path as indicated by flux path 62 in Figures 11 and 12 rather than the path to plate 21. The reluctance of air gap 61 must however be sufficiently low for a signal from coil 18 to cross over and magnetize the clutch and yet it must be sufficiently high to force the bias flux to take the path across the working gap.

Without any current flowing in the operating coils 65, 18 or 80 and 81, the permanent magnets cause each of the clutches to transmit the same amount of force, when they are rotated at the same speed through the gears 12 and 13. Since they are connected in opposition there is no resultant movement of the linkage 14 and the recorder pen 15. When a current is passed through the operating coils 65, or 80 and 81, the force transmitted through one clutch is increased and that transmitted through the other clutch is decreased, depending upon the direction of the current. As a consequence, the forces applied to the linkage 14 are unbalanced and the linkage and the recording pen move in one direction or the other depending upon the direction in which the current through the operating coil ceases or until the difference in forces is balanced, for example, by a spring (not shown) arranged to resist the movement of the linkage 14.

As is well known, there are meters and recorders in which the movement works against a spring and there are others, particularly instruments that work on the null principle, where the movement does not work against a spring but where the movement adjusts the position of some control that in turn balances the current through the control coil thus nulling the system and stopping the movement. The present type of movement may be used in either type or system and therefore the linkage 14 may be restrained by a spring in its movement or may be allowed to move freely and arranged to control a nulling system. The movement of this invention may also be allowed to move freely so that it will record current integrated with time rather than merely current.

What is claimed is:

1. An electrical meter for measuring current that comprises two opposed magnetic particle clutches with their driven faces mechanically coupled together in push-pull arrangement, a single coil to carry the current to be measured and to supply magnetic flux proportional to said current to both clutches in parallel, a single permanent magnet to supply magnetic bias flux to each of said clutches in series to aid the flux produced by said current in one clutch and to subtract from it in the other and a means associated with said push-pull coupling to indicate a measurement of said current.

2. An electrical meter for measuring current that comprises two opposed magnetic particle clutches with their driven faces mechanically coupled together in push-pull arrangement, a single coil to carry the current to be measured and to supply magnetic flux proportional to said current to both clutches in series, a single permanent magnet to supply a magnetic bias flux to each of said clutches in parallel, to aid the flux produced by said current in one clutch and to subtract from it in the other and a means associated with said push-pull coupling to indicate a measurement of said current.

3. An electrical meter for measuring current that comprises two opposed magnetic particle clutches with their driven faces mechanically coupled together in push-pull arrangement, a single coil to carry the current to be measured and to supply magnetic flux proportional to said current to both clutches in series, a source of magnetic bias flux to supply bias flux to each of said clutches in parallel to aid the flux produced by said current in one clutch and to subtract from it in the other and a means associated with said push-pull coupling to indicate a measurement of said current.

4. An electrical meter for measuring current that comprises two opposed magnetic particle clutches with their driven faces mechanically coupled together in push-pull arrangement, a magnetic path common to both clutches, two coils to carry the current to be measured and to supply magnetic flux proportional to said current to both clutches in series via said magnetic path common to both clutches, a source of magnetic bias flux to supply bias flux to each of said clutches in parallel to aid the flux produced by said current in one clutch and to subtract from it in the other and a means associated with said push-pull coupling to indicate a measurement of said current.

5. An electrical meter for measuring current that comprises two opposed magnetic particle clutches with their driven faces mechanically coupled together in push-pull arrangement, a magnetic path common to both clutches, a coil to carry the current to be measured and to supply magnetic flux proportional to said current to both clutches in parallel via said magnetic path common to both clutches, a single source only of magnetic bias flux to supply a bias flux to each of said clutches in series to aid the flux produced by said current in one clutch and to subtract from it in the other and a means associated with said push-pull coupling to indicate a measurement of said current.

References Cited in the file of this patent

UNITED STATES PATENTS

| | | |
|---|---|---|
| 2,453,957 | Allen | Nov. 16, 1948 |
| 2,651,754 | Perry | Sept. 8, 1953 |